UNITED STATES PATENT OFFICE.

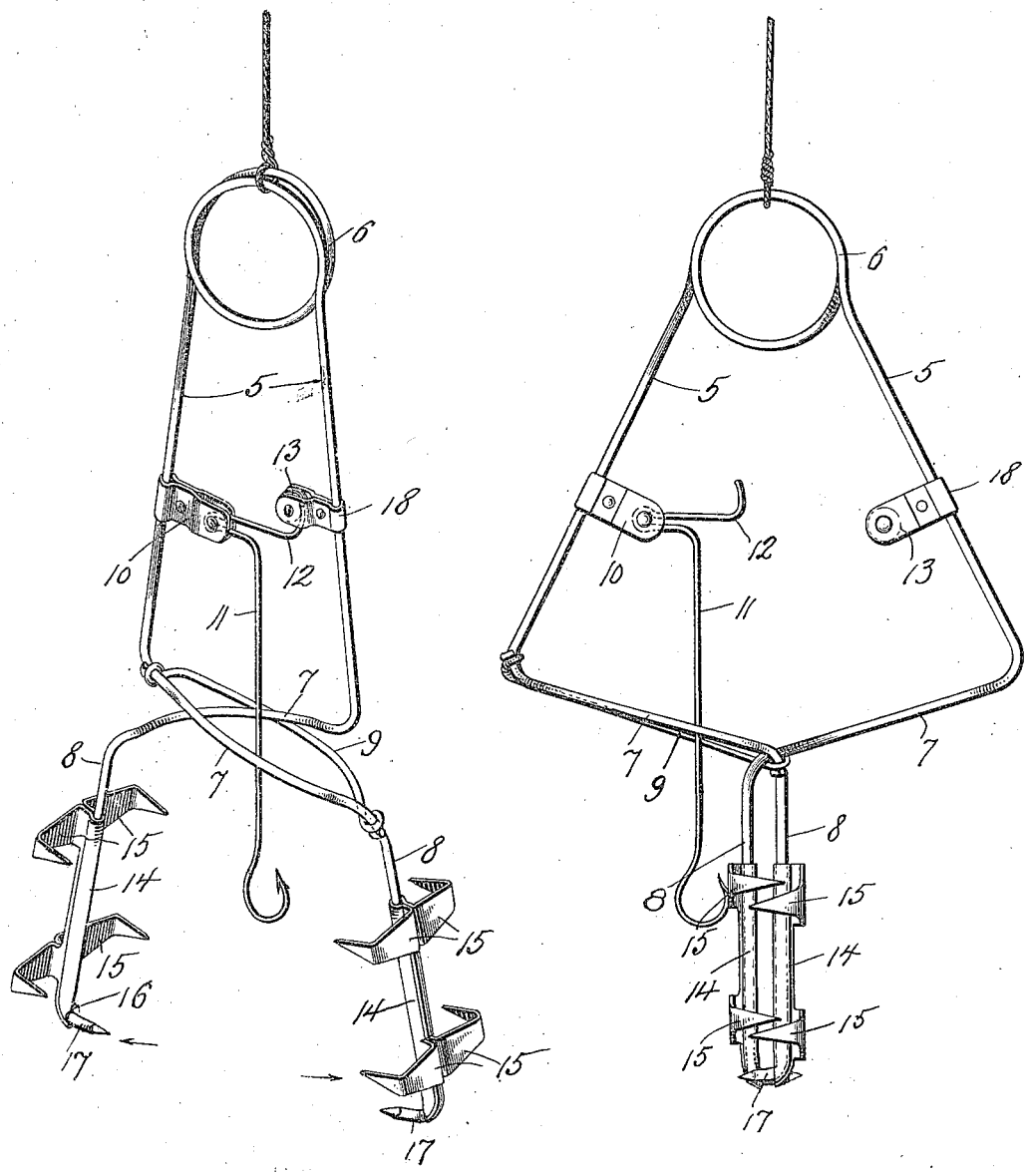

JAMES S. MADDERRA, OF BUTLER, OKLAHOMA.

FISH-HOOK.

1,236,463.  Specification of Letters Patent.  Patented Aug. 14, 1917.

Application filed June 14, 1917. Serial No. 174,729.

*To all whom it may concern:*

Be it known that I, JAMES S. MADDERRA, a citizen of the United States, residing at Butler, in the county of Custer and State of Oklahoma, have invented new and useful Improvements in Fish-Hooks, of which the following is a specification.

This invention relates to fish hooks of the type disclosed in my Patent No. 989717, dated April 18, 1911, and its object is to provide the hook with an improved arrangement of barbs acting in conjunction with the main hook, as will be described in detail hereinafter, and claimed.

In order that the invention may be better understood, reference is had to the accompanying drawing forming a part of this specification, and in said drawing, Figure 1 is a perspective view of the device, Fig. 2 is a side elevation of the device closed up, and Fig. 3 is a detail in perspective.

Referring specifically to the drawing 5 denotes a pair of spaced shanks connected at one end by a spring loop or coil 6 and having at their other end crossed lateral bends 7 terminating in opposite shanks 8 carrying the grabs or barbs to be presently described. One of the bends 7 has a guide 9 in which the other bend works. By the spring loop or coil 6, the shanks 5 have a normal tendency to spread, which action draws the shanks 8 together. One of the shanks 5 carries a support 10 for the main hook 11, the shank of the latter having a lateral hook-shaped bend 12 forming a trigger which is adapted to be engaged with a keeper 13 carried by the other shank. The hook 11 extends downward to come between the shanks 8.

The barbs carried by the shanks 8 comprise sheet metal plates 14 having outstanding tongues 15 at their longitudinal edges, said tongues being tapered outward to a point. The plates are bent into tubular or sleeve-like form to encircle the shanks 8, and the tongues are bent to extend laterally from the shank in opposite directions, with their pointed extremities bent inward, the pointed ends of the barbs of the two shanks therefore being oppositely presented. In order to prevent the sleeves from turning on the shanks their lower ends are notched, as shown at 16, in which notches seat the laterally bent extremities 17 of the shanks. The barbs of the respective shanks are set in alternate order so that their pointed ends do not come together or meet when the shanks close up.

The keeper 13 for the trigger 12 is a roller carried by a support 18 mounted on one of the shanks 5. This form of keeper makes the device very sensitive and assures its proper operation.

The device is set by drawing the shanks 5 together and holding them in this position by engaging the trigger 12 with the keeper 13. Upon drawing the shanks 5 together, the shanks 8 spread and the main hook 11 to which the bait is applied is positioned therebetween. When the fish, turtle or the like disturbs the bait, the main hook swings and withdraws the trigger from its keeper, whereupon the shanks 5 are released and spread, and the shanks 8 of the grabs or barbs close up and the fish is seized by the latter. The device can be used for catching fish, turtles, muskrats, beavers, and in fact any animal, either land or water, that will take a bait.

I claim:

1. A device of the character described comprising a pair of opposite grab shanks having a normal tendency to come together, a trigger mechanism for holding the same spread, and sleeves encircling the shanks and having opposing barbs, said sleeves being provided with notches at their outer ends, and the shanks having lateral bends seating in said notches.

2. A device of the character described comprising a pair of opposite grab shanks having a normal tendency to come together, a trigger mechanism for holding the same spread, and sleeves encircling the shanks and having opposing barbs, the barbs of the respective sleeves being arranged in alternate order.

In testimony whereof I affix my signature.

JAMES S. MADDERRA.

Copies of this patent may be obtained for five cents each, by addressing the "Commissioner of Patents, Washington, D. C."